H. L. BENTON.
LOG LIFTING AND HAULING MACHINE.
APPLICATION FILED MAY 7, 1912. RENEWED SEPT. 16, 1913.
1,092,088.
Patented Mar. 31, 1914.
2 SHEETS—SHEET 1.
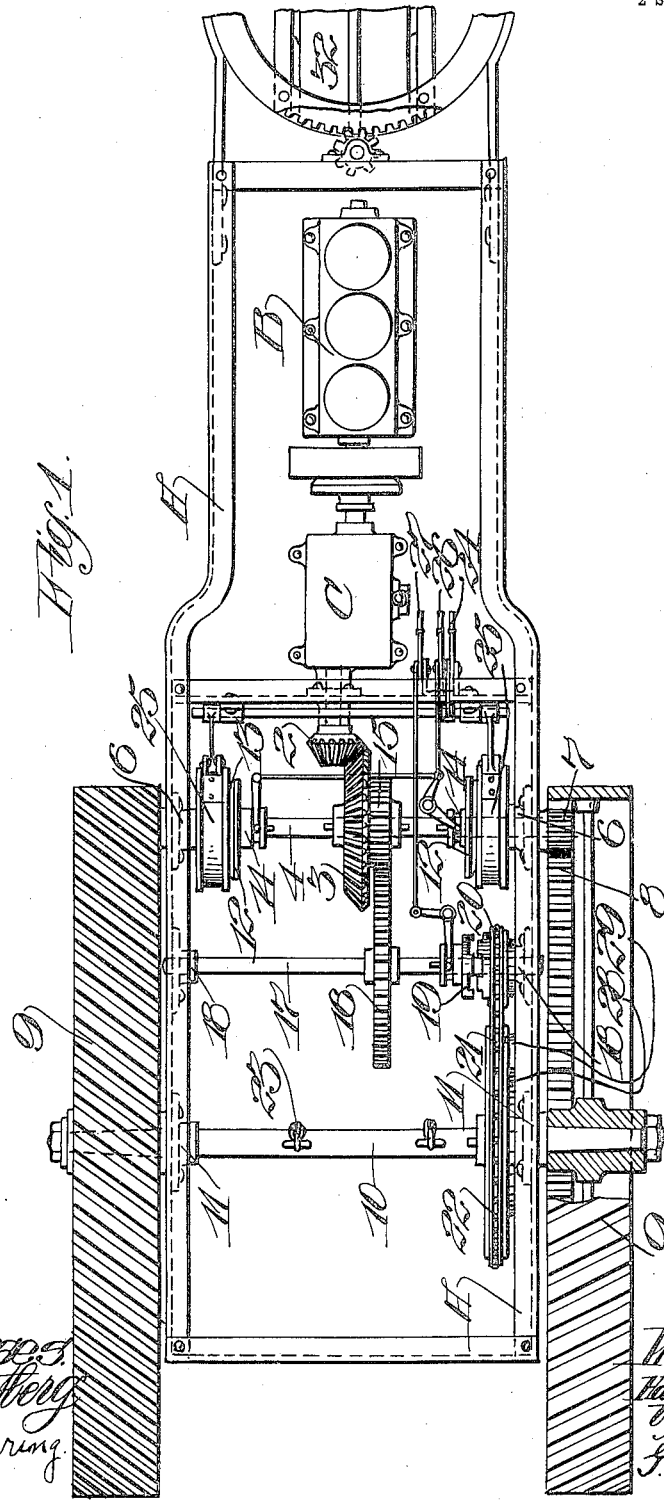

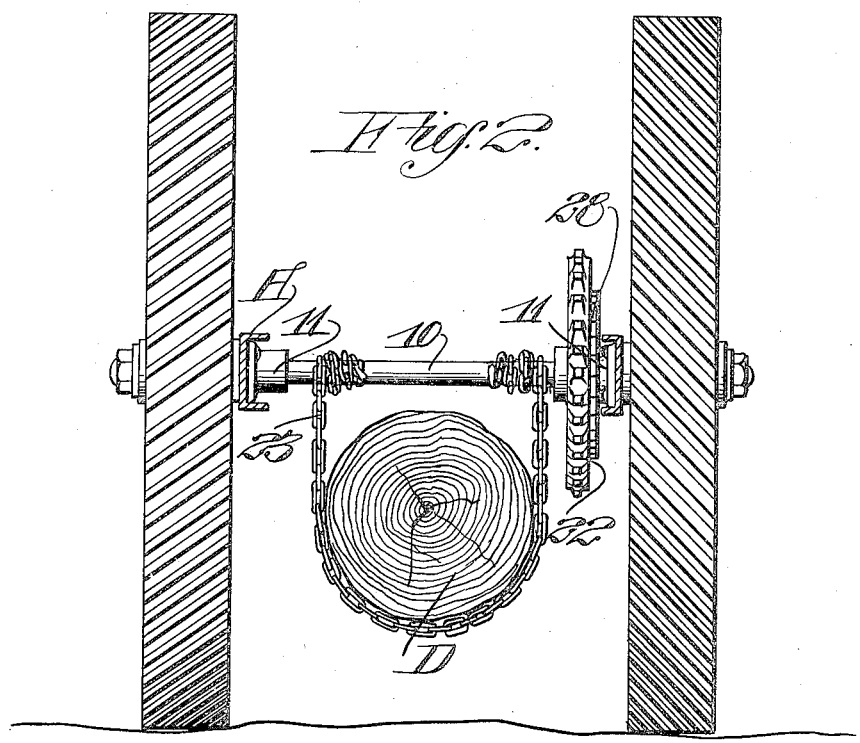
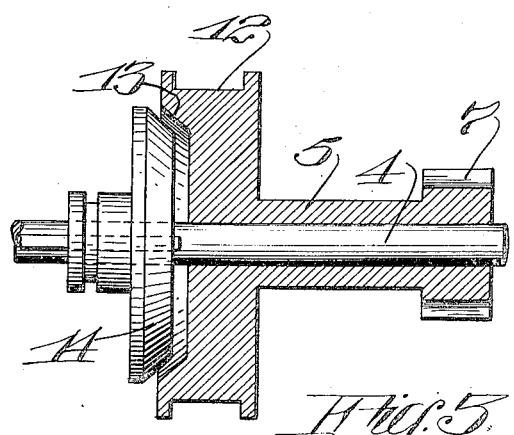

UNITED STATES PATENT OFFICE.

HARRY LEE BENTON, OF REDDING, CALIFORNIA.

LOG LIFTING AND HAULING MACHINE.

1,092,088.     Specification of Letters Patent.    Patented Mar. 31, 1914.

Application filed May 7, 1912, Serial No. 695,654. Renewed September 16, 1913. Serial No. 790,107.

*To all whom it may concern:*

Be it known that I, HARRY LEE BENTON, a citizen of the United States, residing at Redding, in the county of Shasta and State of California, have invented new and useful Improvements in Log Lifting and Hauling Machines, of which the following is a specification.

This invention relates to a motor driven tractor, specially designed for logging purposes.

The object of the invention is the production of a motor driven traction-engine, provided with traction wheels of large diameter, capable of straddling a log, and to provide means whereby the log may be raised off the ground and retained in this position while being hauled by the tractor from one place to another.

Another object is the production of a motor driven traction-engine of simple and substantial design, capable of withstanding the jolts and strains to which an engine of this type is subjected, and to provide a suitable transmission between the engine and the traction members whereby the speed of the tractor may be controlled, and to provide connections with the transmission and engine whereby the log may be raised or lifted.

The invention consists of the parts and the combination and construction of parts as hereinafter more fully described and claimed, having reference to the accompanying drawings, in which—

Figure 1 is a plan view of the tractor partly broken away. Fig. 2 is an end view partly in section showing the lifting mechanism. Fig. 3 is a detail view, partly in section showing one end of the drive shaft with connected parts.

Referring to Fig. 1 of the drawings, I have shown a plan view of my log-lifting and hauling tractor, provided with a suitable frame work A, on which is mounted a gas engine or motor B, connected in any suitable manner with a transmission case C. Mounted on the secondary shaft of the transmission is a bevel pinion 2, intermeshing with a bevel gear 3, keyed to a jack shaft 4 turnable in sleeve 5, mounted in suitable bearings 6 on the main frame A. Secured to the outer ends of the sleeves 5, are pinions 7 intermeshing with internal gears 8, cast integral or otherwise secured to the traction wheels 9, which are turnable on spindles of a shaft 10, which in turn is revoluble in bearings 11 in the main frame A. Secured to the inner ends of the sleeves 5 is a set of brake drums 12, provided with internal tapering friction faces 13, engageable with clutches 14 splined and slidably mounted on the jack shaft 4. 15 is a spur gear secured to the jack shaft which intermeshes with a gear 16 mounted on an intermediate shaft 17, journaled in suitable bearings 18 on the main frame A. This shaft is provided with a jaw-clutch 19 splined and slidably mounted thereon and adapted to interlock with opposed jaws on the face of a sprocket gear 20 loosely mounted on the shaft. The sprocket 20 is connected by a chain 21, with a sprocket gear 22, keyed on the shaft 10 on which the traction wheels are mounted. This shaft is also provided with a chain sling 23, secured in such a manner that when the shaft is revolved the chain will wrap itself around the shaft as shown in Fig. 2, and lift the log as D off the ground. The jack shaft is divided in the center, and provided with any suitable differential which is housed within the gears 3 and 15.

In operation, when it is desired to move a log, the tractor is backed up until the traction wheels straddle one end of the log; the engine clutch is thrown out and the transmission moved into intermediate position in the usual manner of operation; a brake lever 24 is then thrown over to tighten the brake bands 25 surrounding the brake drums, to lock the drums, sleeves and pinions from revolution, the pinions intermeshing as they do with the internal gears on the traction wheels, will lock the wheels and hold the tractor stationary while the log is lifted into position in the chain sling on the rear axle. A lever 26 is next moved to throw the clutches 14 out of engagement with the internal traction face in the brake drum; this leaves the jack shaft free to revolve all driving connections with the traction wheels being disconnected.

The end of the log being in position between the traction wheels, it is only necessary to place the chain sling under the log and raise it up a sufficient distance before hauling it away, as shown in Fig. 2; this is accomplished in the following manner: A lever 27 is moved to throw the jaw-clutch 19 into engagement with the jaws on the face of the sprocket gear 20, the transmission is then thrown into the low gear and the engine clutch connected, the power will be transmitted through the bevel gears 2 and 3, to the jack shaft, which is free to re-volve in the sleeves 5 through the spur gears 15 and 16 to the intermediate shaft 17 and through the clutch 19, sprocket 20, chain 21, and sprocket gear 22 to the rear main shaft which is free to revolve both in the bearings and the traction wheels. The revolving of the shaft will cause the chain to wrap around the shaft and raise the log into position. To hold the log in the raised position, and to prevent the unwinding of the chain when the power is thrown off, I have provided a ratchet wheel 28 mounted on the main shaft 10, which is engageable with a pawl 29 pivoted to the side of the frame A. The log having been raised into position the engine clutch is thrown out, the lever 26 is moved to bring the friction clutches 14 into engagement with the friction faces in the brake drum; the brake lever is then released and the engine clutch let in, the tractor will then be driven ahead on the low gear and carry the log with it. If the log is one of small dimensions, the transmission may be thrown into a higher gear and the speed increased.

The tractor may be equipped with any suitable form of steering wheel, as 32, of the kind usually employed on traction-engines and other heavy vehicles.

Having thus described my invention, what I claim and desire to secure by Letters Patent is—

1. In a log-lifting and hauling tractor the combination with a motor and transmission of a jack shaft, mounted in a revoluble sleeve journaled in the main frame, driving means connecting the jack shaft with the transmission case, an intermediate shaft journaled in the main frame, driving means connecting the intermediate shaft with the jack shaft, a main supporting shaft journaled and revoluble in bearings in the main frame, driving means connecting the main shaft with the intermediate shaft, traction wheels revoluble on spindles on the main shaft, internal gears secured to the traction wheels, driving pinions mounted on the jack shaft and engaging with the internal gears, means for locking and unlocking said pinions to the jack shaft, said last-named means comprising engageable clutch members on the jack-shaft and sleeve, said sleeve being shiftable longitudinally along the jack-shaft, and means independent of the jack shaft for locking the pinions from revolution, to lock the traction wheels, said last-named means including a brake-drum on said sleeve and a brake to engage said drum.

2. In a log-lifting and hauling tractor the combination with a motor and transmission of a jack shaft, mounted in a revoluble sleeve journaled in the main frame, driving means connecting the jack shaft with the transmission case, an intermediate shaft journaled in the main frame, driving means connecting the intermediate shaft with the jack shaft, a main supporting shaft journaled and revoluble in bearings in the main frame, driving means connecting the main shaft with the intermediate shaft, traction wheels revoluble on spindles on the main shaft, internal gears secured to the traction wheels, driving pinions mounted on the jack shaft and engaging with the internal gears, means for locking and unlocking said pinions to the jack shaft, said last-named means comprising engageable clutch members on the jack-shaft and sleeve, said sleeve being shiftable longitudinally along the jack-shaft, means independent of the jack shaft for locking the pinions from revolution to lock the traction wheels, said last-named means comprising a brake drum fixed to said sleeve, and a brake to engage said drum, and means on the intermediate shaft for connecting or disconnecting the driving connections between the main shaft and the intermediate shaft to revolve the main shaft.

3. In a log-lifting and hauling tractor the combination with a motor and transmission of a jack shaft, mounted in a revoluble sleeve journaled in the main frame, driving means connecting the jack shaft with the transmission case, an intermediate shaft journaled in the main frame, driving means connecting the intermediate shaft with the jack shaft, a main supporting shaft journaled and revoluble in bearings in the main frame, driving means connecting the main shaft with the intermediate shaft, traction wheels revoluble on spindles on the main shaft, internal gears secured to the traction wheels, driving pinions mounted on the jack shaft and engaging with the internal gears, means for locking and unlocking said pinions to the jack shaft said last-named means comprising engageable clutch members on the jack-shaft and sleeve, said sleeve being shiftable longitudinally along the jack-shaft, means independent of the jack shaft for locking the pinions from revolution to lock the traction wheels, said last-named means comprising a brake drum fixed to said sleeve, and a brake to engage said drum, means on the intermediate shaft for connecting or disconnecting the driving connections between the main shaft and the intermediate shaft to revolve the main shaft, and a lifting and retaining means on said shaft.

4. In a log-lifting and hauling tractor the combination with a motor and transmission of a jack shaft, mounted in a revoluble sleeve journaled in the main frame, driving means connecting the jack shaft with the transmission case, an intermediate shaft journaled in the main frame, driving means connecting the intermediate shaft with the jack shaft, a main supporting shaft journaled and revoluble in bearings in the main frame, driving means connecting the main shaft with the intermediate shaft, traction wheels revoluble on spindles on the main shaft, internal gears secured to the traction wheels, driving pinions mounted on the jack shaft and engaging with the internal gears, means for locking and unlocking said pinions to the jack shaft, said last-named means comprising engageable clutch members on the jack-shaft and sleeve, said sleeve being shiftable longitudinally along the jack-shaft, means independent of the jack shaft for locking the pinions from revolution to lock the traction wheels, said last-named means comprising a brake drum fixed to said sleeve, and a brake to engage said drum, means on the intermediate shaft for connecting or disconnecting the driving connections between the main shaft and the intermediate shaft to revolve the main shaft, a lifting and carrying means on said shaft, and means on the intermediate shaft to lock the main shaft from revolving.

In testimony whereof I have hereunto set my hand in the presence of two subscribing witnesses.

HARRY LEE BENTON.

Witnesses:
HARRY W. GLOVER,
JAMES D. WRIGHT.